Patented Mar. 6, 1934

1,949,797

UNITED STATES PATENT OFFICE 1,949,797

PROCESS OF PRODUCING COMPOSITIONS OF MATTER CONTAINING SULPHUR IN COLLOIDAL DISTRIBUTION

Hans Kaufmann, Munster, Germany

No Drawing. Application November 11, 1932, Serial No. 642,273. In Germany July 30, 1929

7 Claims. (Cl. 167—72)

The polysulphides of hydrogen have heretofore not been used for the manufacture of healing remedies or curatives but the fact that they decompose extraordinarily easily into free sulphur and sulphuretted hydrogen leads to the idea of utilizing said sulphides for the manufacture of sulphur-containing compositions. If success in obtaining the sulphur in collodial distribution were obtained, that would establish a progress over the processes hitherto employed. During the decomposition the sole by-product which arises is sulphuretted hydrogen which escapes in the gaseous state and can be used anew for the manufacture of hydrogen-polysulphides. The solubility of the substances for instance in chloroform or in benzole, which renders it possible to employ them in the desired degree of dilution, seemed likely to facilitate the process in view.

The hydrogen-polysulphides can be decomposed by water, but in the case of a prolonged duration of the test, the decomposition takes place also without water, exposure to light aiding the reaction.

It has, in fact, been discovered that if mixtures containing hydrogen-polysulphides are decomposed, the sulphur is separated in a form that entails favorable therapeutic effects. As body or carrier substances, carrying the colloidal sulphur, viscid substances, especially ointments or unguents, may be used, but it is also possible to precipitate the colloidal sulphur upon the surface of finely distributed substances. In the first case the hydrogen-polysulphides are mixed very thoroughly with petroleum jelly, water-free wool-fat, and the like, and the decomposition is effected with the aid of such an amount of water as is sufficient for the intended effect. While sulphuretted hydrogen is forcibly developed, the sulphur of the polysulphides separates gradually and remains in colloidal distribution. If solid substances are to be used as base substances or vehicles for the composition, the polysulphides are dissolved preferably in an organic solvent, for instance chloroform, and the respective base substance or body substance is soaked with the solution. When then water is added, the composition, after having been exposed to the air for a sufficiently long time, will contain the sulphur in the desired fine distribution.

The production of healing remedies or curatives in colloidal form in ointments or unguents that form the base composition has already been described in the German printed patent specifications 175,671 and 229,306 of class 30h. According to the Example IX of the latter patent, an aqueous solution of sodium polysulphide is converted into colloidal sulphur by acidifying it with acetic acid. The present improved process is, however, essentially differet therefrom. In the first place, the hydrogen-polysulphidic substances are soluble in organic solvents and can, therefore be diluted with them and used in this dilute state, whereas they are decomposed by water. In the second place, their easy decomposition, when they are left to themselves and under the action of the light, or when water is added, renders the addition of other substances for the separation of the sulphur unnecessary and, therefore, saves a subsequent treatment of the sulphur compositions obtained in order to remove the by-products.

Examples

First example 10 parts of hydrogen persulphide corresponding to the formula $H_2S_2$ are dissolved in 100 parts of chloroform, and talcum is added while the mixture is being energetically agitated. After the volatile chloroform has evaporated, the composition obtained is left to itself for a comparatively long time, or it is mixed while stirring with such an amount of water as is requisite for the decomposition, the water being preferably diluted with acetone or alcohol. The latter liquid may also be added even prior to the evaporation of the chloroform. The product obtained is finally cautiously dried.

Second example 15 parts of hydrogen polysulphide corresponding to the formula $H_2S_2$ are very finely distributed in water-free wool-fat or other ointment or unguent suitable as a base substance for the composition. Then water or a mixture of water and acetone or an alcohol is admixed therewith and the mass is further treated in the described manner until the formation of sulphuretted hydrogen has ceased. If requisite, another substance or substances used in medicine, for instance zinc oxide, may be incorporated into the composition or the unguent or ointment containing the colloidal sulphur.

It will be noted that the various vehicles disclosed in the present application are all insoluble in, that is, immiscible with, water and the term "immiscible" has been used in the claims in this sense and not in the sense that the media or vehicles are not capable of being temporarily mixed with, or emulsified, or suspended in water, namely, various ointments or unguents, petroleum jelly, wool fat, talcum, zinc oxide, etc.

I claim:

1. The process of producing a composition adapted for medicinal uses, containing sulphur colloidally dispersed in a medium which is substantially immiscible with water, which comprises admixing a hydrogen polysulphide with said medium and decomposing said hydrogen polysulphide by means of water.

2. The process of producing a composition adapted for medicinal uses, containing sulphur colloidally dispersed in a medium which is substantially immiscible with water, which comprises dissolving a hydrogen polysulphide in a suitable solvent, admixing the solution with the said medium and decomposing the polysulphide therein into sulphur and hydrogen sulphide.

3. The process of producing a composition adapted for medicinal uses, containing sulphur colloidally dispersed in a medium which is substantially immiscible with water, which comprises dissolving a hydrogen polysulphide in a suitable solvent, admixing the solution with the said medium and decomposing the polysulphide therein into sulphur and hydrogen sulphide by means of water.

4. The process of producing a composition adapted for medicinal uses, containing sulphur colloidally dispersed in a medium which is substantially immiscible with water, which comprises dissolving a hydrogen polysulphide in a suitable solvent, admixing the solution with the said medium and decomposing the polysulphide therein into sulphur and hydrogen sulphide by means of light.

5. The process of producing a composition adapted for medicinal uses, containing sulphur colloidally dispersed in an ointment base, which is substantially immiscible with water, which comprises admixing a hydrogen polysulphide with said ointment base and decomposing said hydrogen polysulphide by means of water.

6. The process of producing a composition adapted for medicinal uses, containing sulphur colloidally dispersed in finely divided talcum, which comprises admixing a hydrogen polysulphide with said talcum and decomposing said hydrogen polysulphide by means of water.

7. The process of producing a composition adapted for medicinal uses, containing zinc oxide and containing also sulphur colloidally dispersed in an ointment base, which is substantially immiscible with water, which comprises admixing a hydrogen polysulphide with said ointment base, decomposing said hydrogen polysulphide by means of water and thereafter incorporating zinc oxide in the resulting ointment base containing the colloidal sulphur thus produced.

HANS KAUFMANN.